United States Patent
Tsuchiya et al.

(10) Patent No.: US 9,306,424 B2
(45) Date of Patent: Apr. 5, 2016

(54) ROTOR FOR ROTARY ELECTRIC MACHINE

(71) Applicant: DENSO CORPORATION, Kariya, Aichi-pref. (JP)

(72) Inventors: Hiroyuki Tsuchiya, Kariya (JP); Koji Kondo, Kiyosu (JP)

(73) Assignee: DENSO CORPORATION, Kariya (JP)

( * ) Notice: Subject to any disclaimer, the term of this patent is extended or adjusted under 35 U.S.C. 154(b) by 270 days.

(21) Appl. No.: 13/958,104

(22) Filed: Aug. 2, 2013

(65) Prior Publication Data

US 2014/0042858 A1    Feb. 13, 2014

(30) Foreign Application Priority Data

Aug. 8, 2012    (JP) .................. 2012-175772

(51) Int. Cl.
*H02K 15/03* (2006.01)
*H02K 1/28* (2006.01)
*H02K 21/04* (2006.01)

(52) U.S. Cl.
CPC ................ *H02K 1/28* (2013.01); *H02K 21/044* (2013.01)

(58) Field of Classification Search
CPC ............................ H02K 21/044; H02K 1/24
USPC ........................ 310/156.66–156.73
See application file for complete search history.

(56) References Cited

U.S. PATENT DOCUMENTS

| | | | |
|---|---|---|---|
| 5,483,116 A * | 1/1996 | Kusase et al. ................. | 310/263 |
| 5,907,209 A * | 5/1999 | Ishida .......................... | 310/263 |
| 5,973,435 A | 10/1999 | Irie et al. | |
| 6,376,956 B1 * | 4/2002 | Hosoya .................... | 310/154.17 |
| 6,548,935 B1 * | 4/2003 | Shendi et al. ................ | 310/263 |
| 7,414,342 B2 * | 8/2008 | Maeda et al. ............ | 310/156.72 |
| 7,605,518 B2 * | 10/2009 | Nakamura ..................... | 310/263 |
| 8,446,064 B2 * | 5/2013 | Pfleger et al. ................ | 310/263 |
| 8,810,101 B2 * | 8/2014 | Kondo ..................... | 310/156.72 |
| 2010/0001605 A1 * | 1/2010 | Tajima ................. | H02K 21/044 310/156.22 |
| 2010/0109466 A1 | 5/2010 | Kondo et al. | |
| 2010/0164314 A1 | 7/2010 | Ueno | |

FOREIGN PATENT DOCUMENTS

| | | |
|---|---|---|
| DE | 102006041981 A1 | 3/2008 |
| JP | A-10-313559 | 11/1998 |
| JP | A-2004-7858 | 1/2004 |
| JP | A-2009-50131 | 3/2009 |

(Continued)

OTHER PUBLICATIONS

Jul. 15, 2014 Office Action issued in Japanese Application No. 2012-175772 (with translation).

*Primary Examiner* — Burton Mullins
(74) *Attorney, Agent, or Firm* — Oliff PLC

(57) ABSTRACT

A rotor for a rotary electric machine includes a pair of Lundell-type cores, a plurality of magnets, and a magnet retainer. The pair of Lundell-type cores includes a plurality of claw poles with flange portions projecting to a circumferential direction of the rotor from an end portion on an outer diameter side of each of the claw poles. The plurality of magnets are arranged between the pair of Lundell-type cores, and are magnetized in a direction of reducing flux leakage. The magnet retainer retains each of the magnets, and has side surfaces in the circumferential direction. At least one of the side surfaces is provided with at least one projection for restraining movement of the magnet retainer in an axial direction along a rotary shaft.

18 Claims, 9 Drawing Sheets

(56) References Cited

FOREIGN PATENT DOCUMENTS

| JP | A-2010-16958 | 1/2010 |
| JP | A-2010-136549 | 6/2010 |
| JP | A-2010-158105 | 7/2010 |
| WO | WO 2009003855 A1 * | 1/2009 ............... H02K 1/22 |

* cited by examiner

ROTOR FOR ROTARY ELECTRIC MACHINE

CROSS-REFERENCE TO RELATED APPLICATION

This application is based on and claims the benefit of priority from earlier Japanese Patent Application No. 2012-175772 filed Aug. 8, 2012, the description of which is incorporated herein by reference.

BACKGROUND

1. Technical Field

The present invention relates to a rotor for a rotary electric machine, which is mounted onto vehicles such as passenger vehicles and trucks.

2. Related Art

In a well-known rotary electric machine, a pole core has claw poles on each of which magnets are mounted on both of its circumferential side surfaces to reduce flux leakage. Further, in such a rotary electric machine, a magnet retainer is pressed against each of the side surfaces of each claw pole, using elastic force that acts in the rotation direction of the rotor. Thus, the magnets are each ensured to be held between the claw poles (e.g. see a patent document JP-A-2010-016958). By providing the rotor with such a structure, the magnets are prevented from being displaced in the axial direction when the rotor is rotated.

In the rotor of a rotary electric machine disclosed in the patent document JP-A-2010-016958, each magnet retainer, which is permitted to have an elastic force, is merely partially pressed against the side surface of a claw pole to use the frictional force that acts between the magnet retainer and the claw pole to thereby prevent displacement of the magnet retainer. However, this does not sufficiently prevent displacement caused by a stress, such as vibration. Thus, the rotor as disclosed in the patent document JP-A-2010-016958 suffers from a problem of impairing the reliability of fixing the magnet retainers.

The displacement of the magnet retainers may be alleviated by intensifying the force of partially pressing each magnet retainer against the side surface of a claw pole or against the bobbin of a field winding. However, in this case, each magnet retainer has to inserted and assembled between the claw poles in a state where the magnet retainer is partially pressed such as against the side surface of a claw pole with a strong force, so as not to be displaced. Therefore, the insertion of each magnet retainer requires a large force, disabling easy assemblage of the magnet retainers and thus impairing workability.

SUMMARY

The present disclosure provides a rotor for a rotary electric machine, the rotor facilitating assemblage of magnet retainers and reliably preventing displacement of the magnet retainers.

According to one aspect of the present disclosure, there is provided a rotor for a rotary electric machine, comprising: a pair of Lundell-type cores that includes a plurality of claw poles with flange portions projecting to a circumferential direction of the rotor from an end portion on an outer diameter side of each of the claw poles; a plurality of magnets that are arranged between the pair of Lundell-type cores and are magnetized in a direction of reducing flux leakage; and a magnet retainer that retains each of the magnets and has side surfaces in the circumferential direction, at least one of the side surfaces being provided with at least one projection for restraining movement of the magnet retainer in an axial direction along a rotary shaft.

Since the projections of each magnet retainer restrain the movement of the magnet retainer in the direction along the rotary shaft, the magnet retainer is reliably prevented from being displaced. Further, the magnet retainer is not required to be pressed with a strong force so as not to move when assembled between the claw poles. Accordingly, assemblage of the magnet retainer is facilitated and thus favorable workability is ensured.

DESCRIPTION OF EMBODIMENTS

With reference to the accompanying drawings, hereinafter is described an exemplary embodiment of a vehicle alternator to which the present invention is applied.

Figure 1:
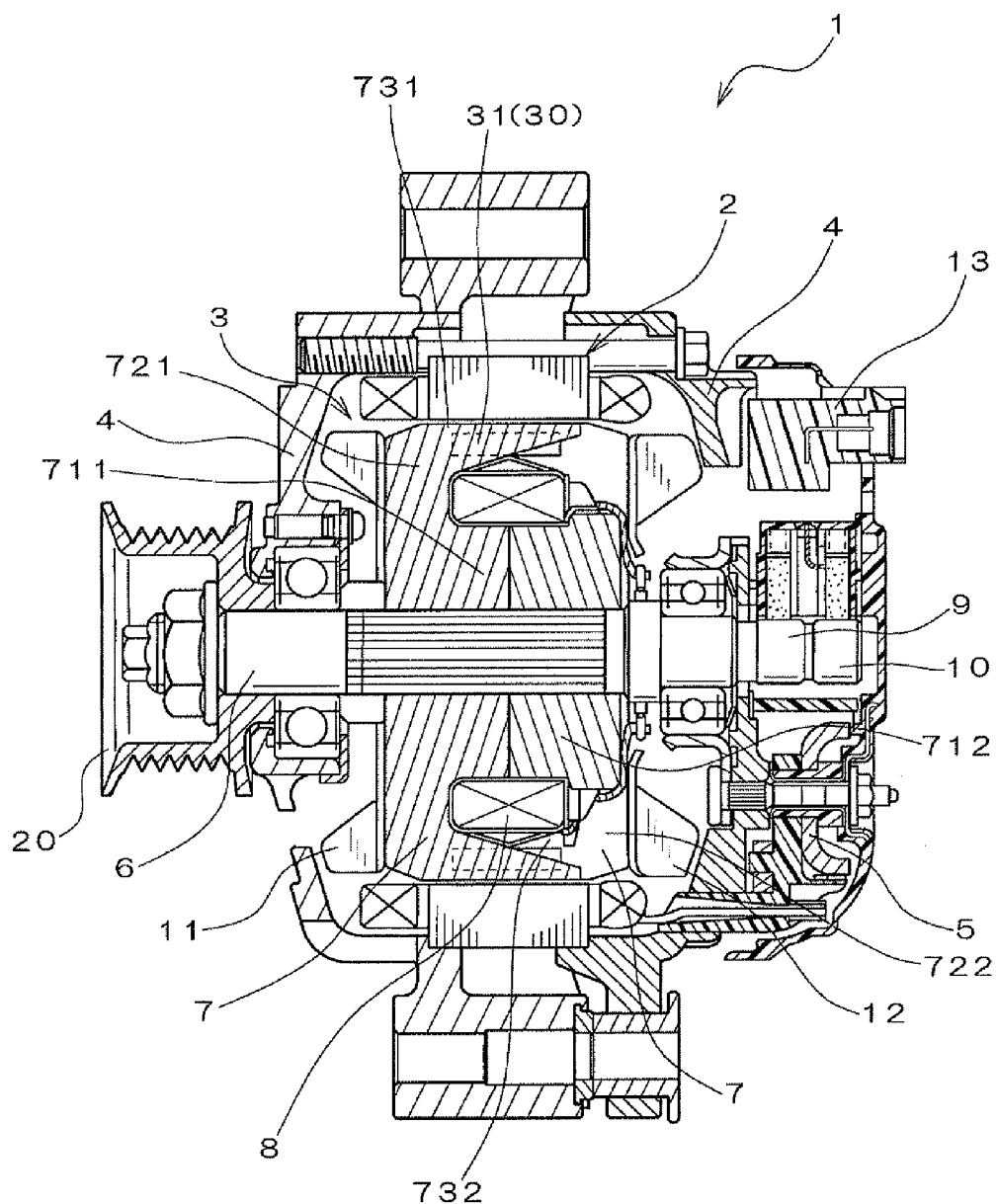
FIG. 1 is a cross sectional-view showing a principal part of a vehicle alternator, according to an exemplary embodiment of the present invention.
Figure 2:
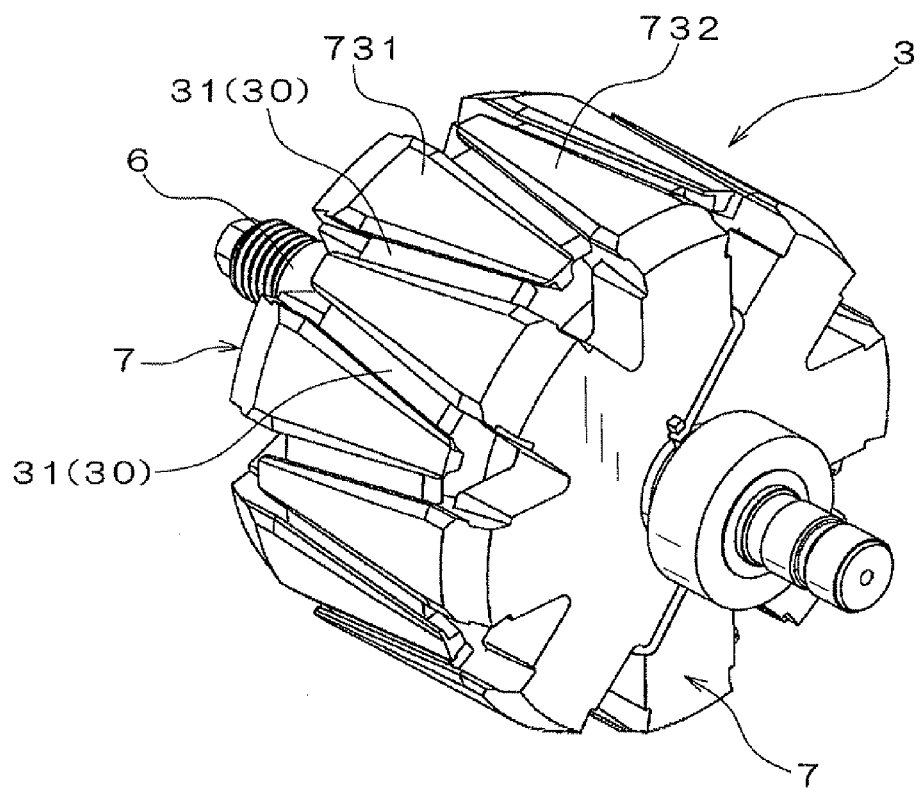
FIG. 2 is a perspective view showing a rotor of the vehicle alternator shown in FIG. 1.

FIG. 1 is a cross sectional-view illustrating a principal part of a vehicle alternator 1, according to the present embodiment. As shown in FIG. 1, the vehicle alternator 1 includes a stator 2, a rotor 3, a housing 4, and a rectifier 5. The stator 2 serves as an armature. The rotor 3 serves as a field element. The housing 4 supports the stator 2 and the rotor 3. The rectifier 5 converts an alternating-current (AC) power to a direct-current (DC) power. The rotor 3 has axial end faces onto which cooling fans are fixed, although not shown in FIG. 2.

Figure 5:
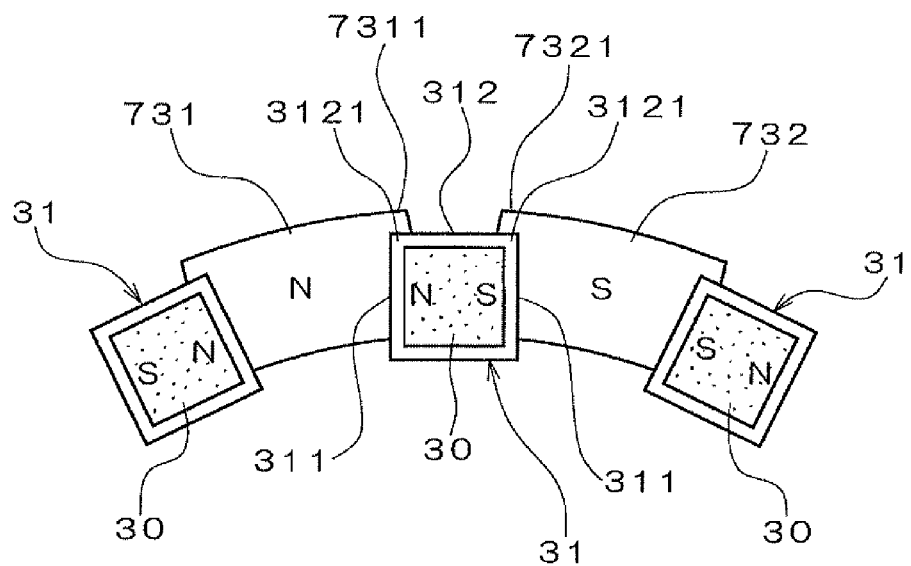
FIG. 5 is an explanatory view showing adjacent claw poles relative to a magnet retainer and a magnet arranged between the claw poles of the rotor shown in FIG. 2.

The rotor 3 rotates integrally with a rotary shaft 6, and includes a pair of Lundell-type pole cores (Lundell-type core) 7, a field coil 8, slip rings 9 and 10, cooling fans 11 and 12, and magnet retainers 31. The field coil 8 magnetizes the Lundell-type pole cores 7. The slip rings 9 and 10 are provided near a rear end portion of the rotary shaft 6 for the connection to both ends of the field coil 8. The cooling fans 11 and 12 are mounted to respective axial end faces of the Lundell-type pole cores 7. The magnet retainers 31 are arranged between the Lundell-type pole cores 7, and retain respective magnets 30 that are magnetized in a direction of reducing flux leakage (see FIG. 5) caused between the pole cores 7.

Each magnet 30 may be a rare-earth magnet, such as a neodymium magnet. Each magnet retainer 31 is made up of a non-magnetic material, e.g., a non-magnetic metal plate such as a stainless steel plate. By using the magnet retainer 31 made of a non-magnetic material, the reduction of magnetic flux can be more mitigated, compared to the case of using a magnet retainer 31 made of a magnetic material.

The rotary shaft 6, which is connected to a pulley 20, is rotated and driven by an engine for travelling (not shown) which is installed in the vehicle. The Lundell-type pole core 7 on a pulley side includes a boss portion 711, a disc portion 721 and a plurality of claw poles 731. The boss portion 711 is assembled to the rotary shaft 6. The disc portion 721 extends further in the radial direction than a pulley-side end portion of the boss portion 711. The plurality of claw poles 731 each extend in the axial direction from the outer peripheral side of the disc portion 721.

The other Lundell-type pole core 7 on a side opposite to the pulley side includes a boss portion 712, a disc portion 722 and a plurality of claw poles 732. The boss portion 712 is assembled to the rotary shaft 6. The disc portion 722 extends further in the radial direction than an end portion of the boss portion 712, the end portion being on a side opposite to the pulley side. The plurality of claw poles 732 each extend in the axial direction from the outer peripheral side of the of the disc portion 722.

These pole cores 7 are formed by forging. For assemblage, the pair of Lundell-type pole cores 7 are press-fitted to the rotary shaft 6 in a state where the plurality of claw poles 731 are engages with the respective plurality of claw poles 732, with the field coil 8 being arranged on the outer peripheral side of the boss portions 711 and 712.

The number of the claw poles 731 and 732 is generally six to eight. For example, in the present embodiment, the number of poles is set to eight. When field current is passed from a regulator 13 to the field coil 8 via the slip rings 9 and 10, the claw poles 731 are magnetized as N poles, while the claw poles 732 are magnetized as S poles.

Figure 3:
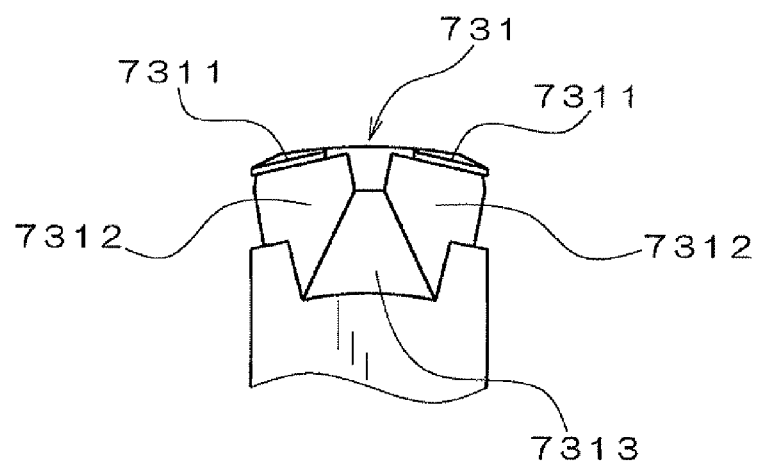
FIG. 3 is a partial plan view showing the shape of a claw pole of the rotor shown in FIG. 2.
Figure 4:
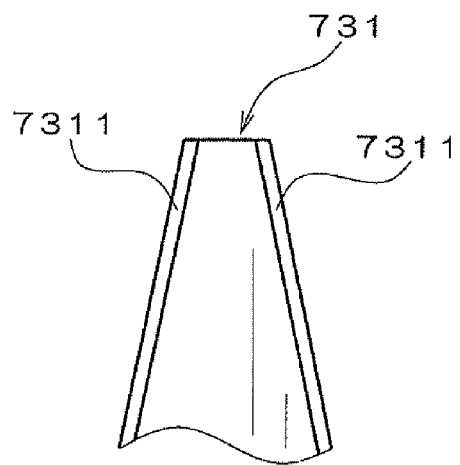
FIG. 4 is a partial side view showing the shape of the claw pole shown in FIG. 3.

FIGS. 3 and 4 are a partial plan view and a partial side view, respectively, illustrating the shape of the claw pole 731 of the rotor 3. As shown in FIGS. 3 and 4, each claw pole 731 has flange portions 7311, circumferential side surfaces 7312 and an inner diameter surface 7313. The flange portions 7311 project to circumferential sides from an end portion on the outer diameter side of each claw pole 731. The circumferential side surfaces 7312 each face the adjacent claw pole 732. The inner diameter surface 7313 faces the field coil 8 which is arranged on an inner peripheral side when the pole cores 7 are assembled. Each claw pole 732 has a similar configuration. That is, each claw pole 732 has flange portions 7321, circumferential side surfaces 7322, and an inner diameter surface 7323. The circumferential side surfaces 7312 and 7322 may each have a surface profile as it is at the time of forging, or a surface profile that has been subjected to cutting.

Figure 6:
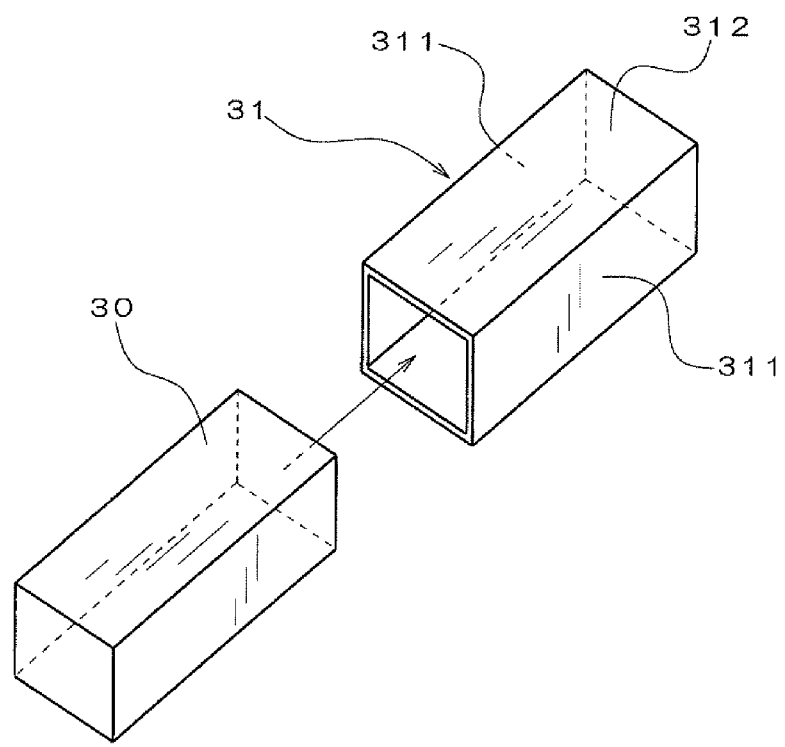
FIG. 6 is an explanatory view showing a magnet and a magnet retainer of the rotor shown in FIG. 2.

FIG. 6 is an explanatory view illustrating the magnet 30 and the magnet retainer 31. As shown in FIG. 6, the magnet retainer 31 has a rectangular parallelopiped shaped, with its one face being open for the insertion of the magnet 30. Other five faces of the magnet retainer 31 form wall surfaces for accommodating and retaining the magnet 30.

In the present embodiment, the magnet retainer 31 has side surfaces that are divided into circumferential side surfaces (foaming a pair of circumferentially opposed surfaces that are opposed to each other) 311 and radial side surfaces (forming a pair of radially opposed surfaces that are opposed to each other) 312. The circumferential side surfaces 311 are sandwiched between the circumferentially adjacent claw poles 731 and 732 via their circumferential side surfaces 7312 and 7322. The radial side surfaces 312 has partial portions 3121 on the outer diameter side, which are in contact with the flange 7311 of the claw pole 731 and the flange 7321 of the claw pole 732.

Thus, each magnet retainer 31 is arranged between the claw poles 731 and 732. In the present embodiment, at least one of the circumferential side surfaces 311 is provided with a projection that restrains the movement of the magnet retainer 31 in the axial direction (the direction along the rotary shaft 6) (the projection is omitted in FIG. 6). A specific example of the projection will be described later.

It should be appreciated that one magnet retainer 31 is provided for each magnet 30. Further, each of the magnet retainers 31 is independent in the axial direction. The independency of the magnet retainers 31 in the axial direction can eliminate the necessity of arranging a member for connecting the plurality of magnet retainers 31, on the axial end faces of the Lundell-type pole cores 7. Therefore, large areas for welding the cooling fans 11 and 12 are ensured in the respective axial end faces.

The magnet 30 is magnetized such that: one side surface thereof will serve as N pole, the side surface being opposed to the circumferential side surface 7312 of the claw pole 731, for example, which turns to N pole when current is passed through the field coil 8; and the other side surface thereof will serve as S pole, the side surface being opposed to the circumferential side surface 7322 of the claw pole 732, for example, which turns to S pole when current is passed through the field coil 8. Such a way of magnetization of the magnet 30 can contribute to preventing flux leakage between the claw poles 731 and 732.

The magnet 30 is magnetized after finishing the cutting process or the like in relation to the rotor 3. Specifically, when the magnet retainers 31 are each assembled between the claw poles 731 and 732, the magnets 30, which are not yet magnetized, are used. In the cutting process in relation to the rotor 3, the outer peripheral surfaces of the Lundell-type pole cores 7, the outer peripheral surface of the rotary shaft 6, and the like are required to be finally cut in such a way that the dimensional accuracy of these surfaces is ensured. The magnets 30 are magnetized after finishing the cutting process.

Since the cutting process is performed before magnetizing the magnets 30, the powdery cuttings resulting from the process are not magnetized and thus can be easily washed away using a cleaning solution. As the method of magnetizing the magnets 30 after assembling the rotor 3, any method based on conventional art is usable. For example, the magnets 30 may be magnetized using the magnetizing device disclosed in patent document JP-A-2009-050131.

Figure 7:
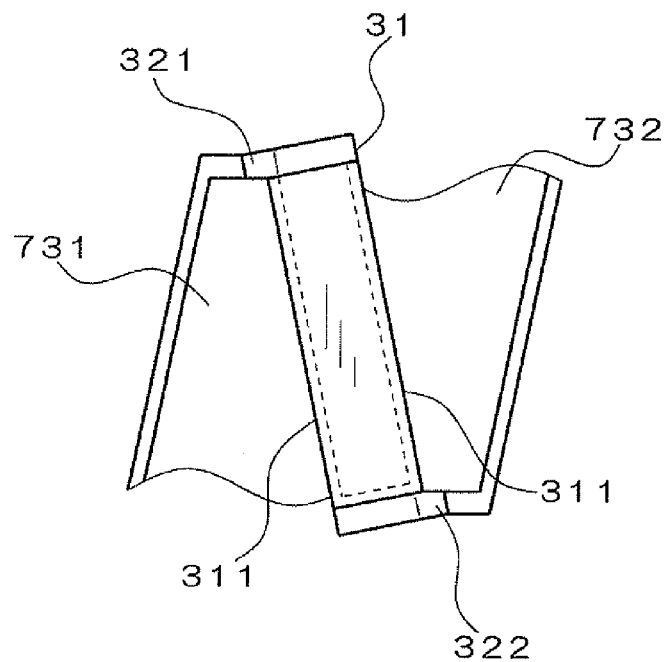
FIG. 7 is a schematic view showing a specific example of a projection that is provided in a circumferential side surface of the magnet retainer of the rotor shown in FIG. 2.

Hereinafter is specifically described the projection provided on a circumferential side surface of each magnet retainer 31. FIG. 7 illustrates a specific example of the projection. In FIG. 7, one circumferential side surface 311 of the magnet retainer 31 has an end portion which is provided with a projection 321 projected in the circumferential direction. When the magnet retainer 31 is assembled between the claw poles 731 and 732, the projection 321 is brought into contact with an end portion of the claw pole 731. The other circumferential side surface 311 of the magnet retainer 31 has an end portion which is provided with a projection 322 projected in the circumferential direction. When the magnet retainer 31 is assembled between the claw poles 731 and 732, the projection 322 is brought into contact with an end portion of the claw pole 732.

Figures 8A, 8B, 8C:
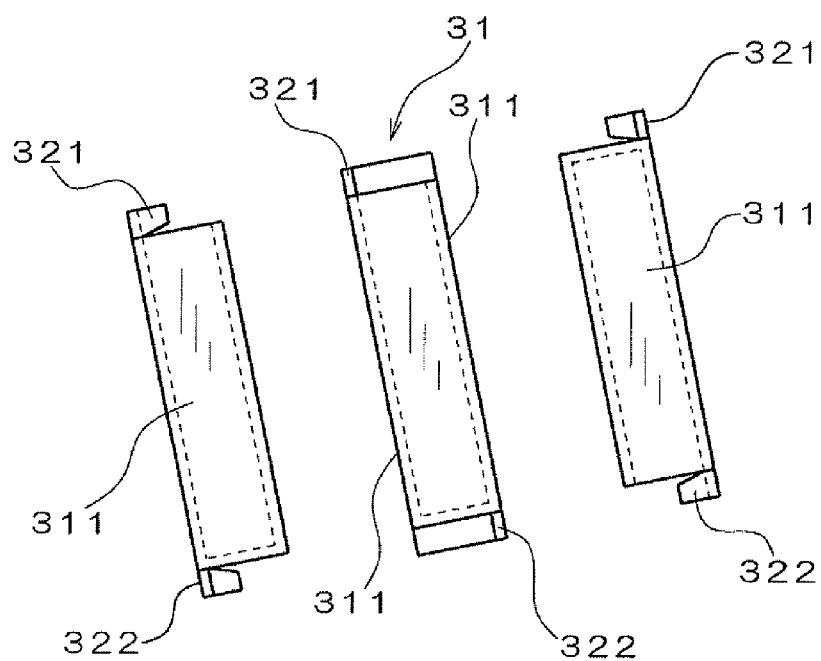
FIG. 8A is a plan view showing the shape of the magnet retainer shown in FIG. 7 at the time of being assembled.
FIG. 8B is a left-side view of the magnet retainer shown in FIG. 8A.
FIG. 8C is a right-side view of the magnet retainer shown in FIG. 8A.

FIGS. 8A to 8C illustrate the shape of the magnet retainer 31 illustrated in FIG. 7, at the time of being assembled. As shown in FIGS. 8A to 8C, in a state before assemblage, the projection 321 of the magnet retainer 31 is folded in parallel with one circumferential side surface 311, while the projection 322 is folded in parallel with the other circumferential side surface 311. These projections 321 and 322 are bent by 90° after the magnet retainer 31 has been inserted and assembled between the claw poles 731 and 732.

In this way, the magnet retainer 31 has a pair of projections 321 and 322 that are in contact with the end portions of the two claw poles 731 and 732, respectively, which are adjacent to each other via the magnet retainer 31. By the two projections 321 and 322 sandwiching the end portions of two claw poles 731 and 732, axial displacement of the magnet retainer 31 is reliably prevented.

Figure 9:
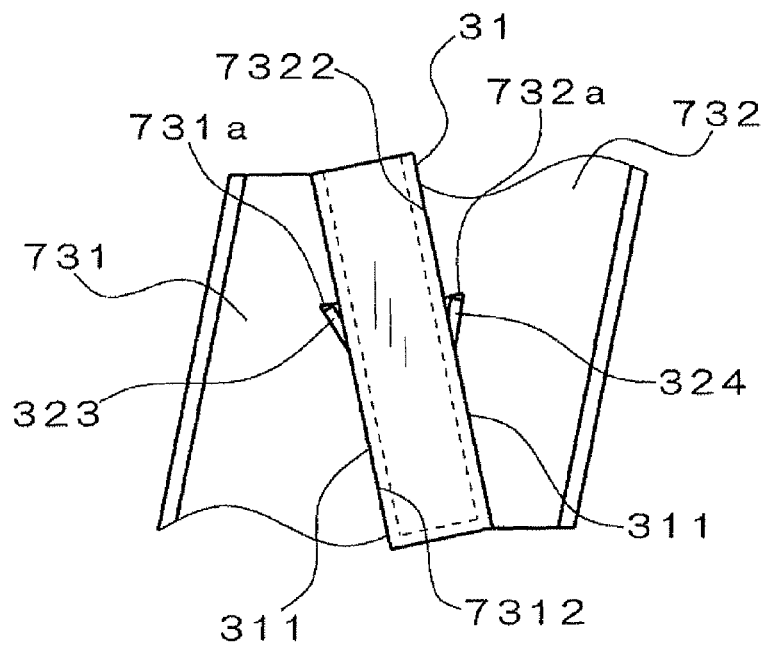
FIG. 9 is a schematic view showing another specific example of a projection provided in a circumferential side surface of the magnet retainer of the rotor shown in FIG. 2.
Figure 10:
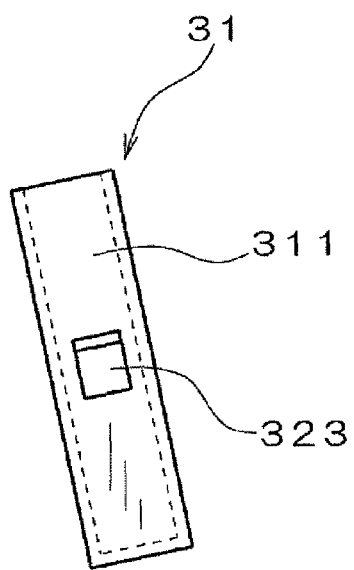
FIG. 10 is a schematic view showing one circumferential side surface of the magnet retainer shown in FIG. 9.

FIG. 9 illustrates another specific example of the projection provided in a circumferential side surface of the magnet retainer 31. FIG. 10 illustrates one circumferential side surface 311 of the magnet retainer 31 illustrated in FIG. 9.

In the specific example shown in FIGS. 9 and 10, the two circumferential side surfaces 311 of the magnet retainer 31 are provided with projections 323 and 324, respectively. The projections 323 and 324 correspond to parts of the respective circumferential side surfaces 311, the parts being bent outside. The circumferential side surface 7312 of the claw pole 731 has a portion in which a recess 731a is formed so as to be engageable with the projection 323. Further, the circumferential side surface 7322 of the claw pole 732 has a portion in which a recess 732a is formed so as to be engageable with the projection 324.

When the magnet retainer 31 is press-fitted between the claw poles 731 and 732, the projections 323 and 324 are fitted to and accommodated in the recesses 731a and 732a, respectively. Thus, the axial displacement of the magnet retainer 31 is reliably prevented. The direction of the projections 323 and 324 may be reversed and recesses 731a and 732a engageable with the reversed projections 323 and 324, respectively, may be provided.

As described above, in the rotor 3 of the vehicle alternator 1 according to the present embodiment, the movement of each magnet retainer 31 in the direction along the rotary shaft 6 is restrained by the projections 321, 322, 323 and 324 of the magnet retainer 31. Therefore, the magnet retainer 31 is reliably prevented from being displaced. Further, the magnet retainer 31 is not required to be pressed with a strong force so as not to move when assembled between the claw poles 731 and 732. Accordingly, assemblage of the magnet retainer 31 is facilitated to ensure favorable workability.

The present invention is not limited to the embodiment described above but may be implemented in various modifications within a scope not departing from the spirit of the present invention. For example, in the embodiment described above, each magnet retainer 31 is arranged between adjacent claw poles 731 and 732. Alternative to this, an annular ring member 74 may be assembled to the claw poles 731 and 732 so as to be in contact with their inner diameter surfaces 7313 and 7323, respectively, followed by mounting the magnet retainers 31 on the ring member 74 for fixation thereto.

Figure 11:
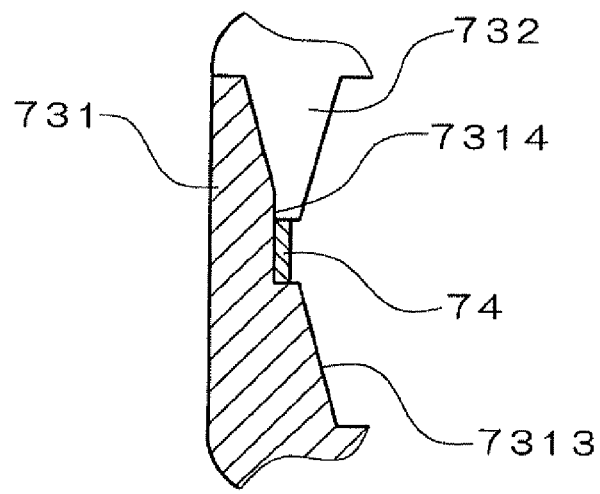
FIG. 11 is a partial cross sectional view illustrating a state where a ring member is mounted to claw poles.
Figure 12:
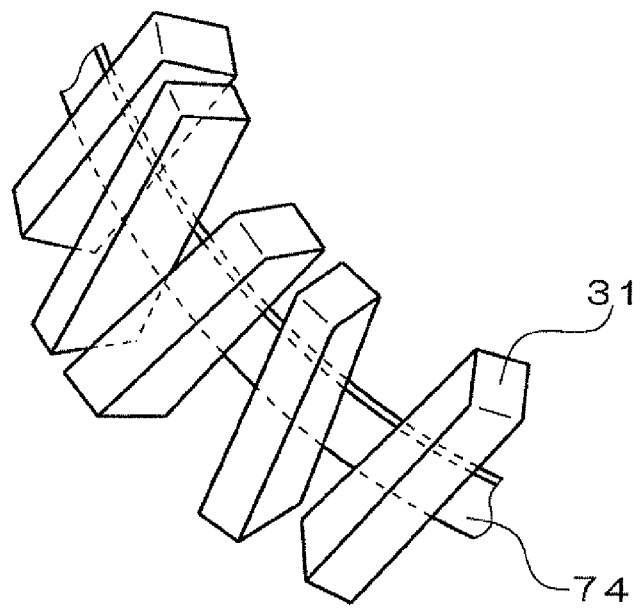
FIG. 12 is a partial perspective view illustrating a state where the magnet retainers are mounted on the ring member.

FIG. 11 is a partial cross sectional view illustrating a state where the ring member 74 is mounted to claw poles 731 and 732. FIG. 12 is a partial perspective view illustrating a state where the magnet retainers 31 are mounted on the ring member 74. As shown in FIGS. 11 and 12, the inner diameter surface 7313 of the claw pole 731 is provided with a cut 7314 to which the ring member 74 is fitted. Similarly, the inner diameter surface 7323 of the claw pole 732 is provided with a cut 7324 to which the ring member 74 is fitted. In a state where the ring member 74 is fitted to the cuts 7314 and 7324, the Lundell-type pole cores 7 are assembled. At this stage, the magnet retainers 31 are not yet mounted on the ring member 74.

Figure 13:
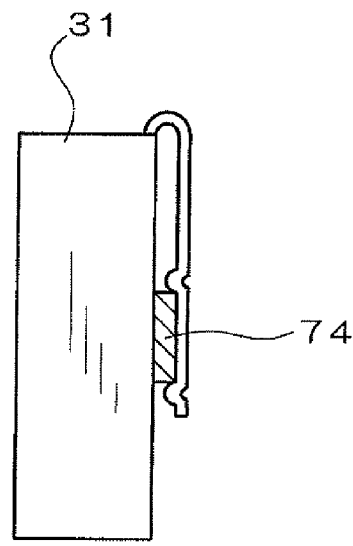
FIG. 13 is a schematic view showing a snap-fit structure used for mounting the magnet retainer on the ring member.

After that, each magnet retainer 31 is inserted into a space between the adjacent claw poles 731 and 732. In this case, each magnet retainer 31 is engaged with the ring member 74 for fixation. For example, the engagement may be performed using the following method. Specifically, one surface of each magnet retainer 31 (the surface that will be located radially inward when the magnet retainer 31 is inserted between the claw poles 731 and 732) may be folded back to realize a snap-fit structure as shown in FIG. 13. Thus, an engagement portion is formed, by which the ring member 74 can be clamped. Then, the engagement portion may be engaged with the ring member 74 to thereby fix the magnet retainer 31.

In this way, use of the ring member 74 for the fixation of the magnet retainer 31 can prevent the axial displacement of the magnet retainers 31. Further, in the present modification, the magnet retainers 31 are mounted after the ring member 74 has been mounted to the Lundell-type pole cores 7. Accordingly, in the event that the relative circumferential position of the pair of Lundell-type pole cores 7 is shifted within an allowable range, the magnet retainers 31 can be mounted at appropriate positions. Thus, accuracy is enhanced in mounting the magnet retainers 31.

Alternatively, a resin material may be filled in at least either of (desirably, both of) between each magnet retainer 31 and the magnet 30 and between each magnet retainer 31 and the claw pole 731 or 732. For example, the resin material used in this case is a thermosetting liquid material. Thus, the magnet 30 is prevented from being displaced in the magnet retainer 31, or the magnet retainer 31 is prevented from being displaced between the claw poles 731 and 732.

The embodiment described above uses the magnet retainer 31 (see FIG. 6) having five faces that are wall surfaces and one face that is open for the magnet 30 to be inserted therethrough. Alternative to this, a magnet retainer may include a first surface that faces the inner diameter surface 7313 or 7323 of the claw pole 731 or 732, a second surface that faces the circumferential side surface 7312 of the claw pole 731 and a third surface that faces the circumferential side surface 7322 of the claw pole 732, with the omission of other surfaces.

Being provided with the first surface, the magnet 30 is entirely restrained in its radially outward movement. At the same time, an excessively large stress is prevented from being applied to the magnet 30, in the vicinity of the end portions of the flange portions 7311 and 7321 of the claw poles 731 and 732, respectively.

Further, being provided with the second and third surfaces, the partial unevenness in the circumferential side surfaces 7312 and 7322 of the claw poles 731 and 732, each of which has a surface profile as it is at the time of forging, will help prevent collection of an excessively large stress to the magnet 30.

Figure 14B:
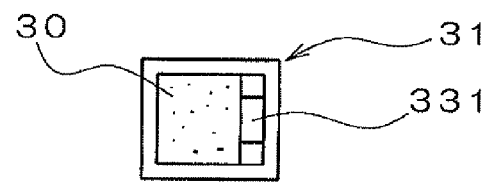
FIG. 14B is a rear view of the magnet retainer shown in FIG. 14A.
Figure 14A:
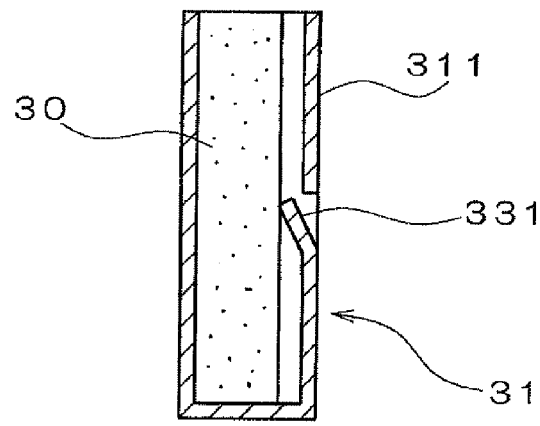
FIG. 14A is a plan view showing a modification of the magnet retainer.

Alternatively, as shown in FIGS. 14A and 14B, the circumferential side surface 311 of the magnet retainer 31 may be partially bent inside to form a first pressing portion 331 that presses the magnet in the circumferential direction. Thus, the magnet 30 is prevented from being displaced in the circumferential direction in the magnet retainer 31. However, in this case, the first pressing portion 331 is required to be formed at a position different from the positions of the projections 323 and 324 shown in FIG. 9.

Figure 15B:
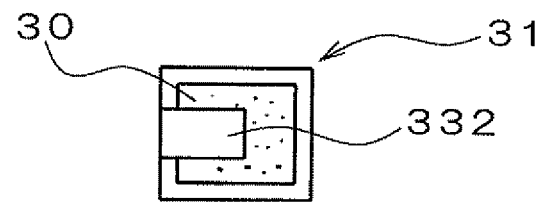
FIG. 15B is a rear view of the magnet retainer shown in FIG. 15A.
Figure 15A:
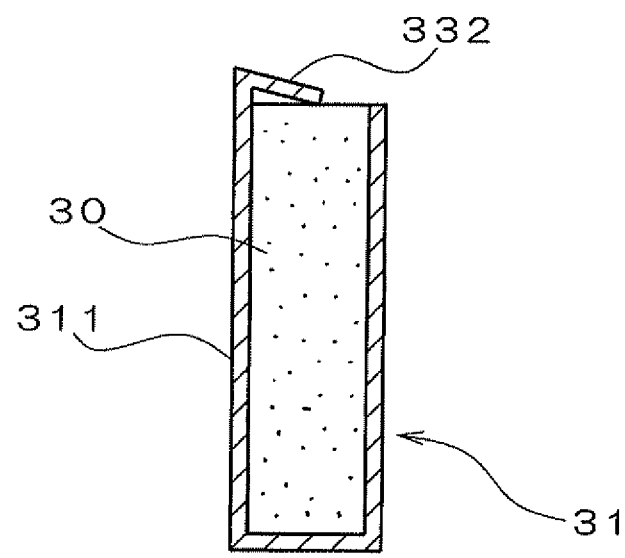
FIG. 15A is a plan view showing another modification of the magnet retainer.

Alternatively, as shown in FIGS. 15A and 15B, an end portion of the circumferential side surface 311 of the magnet retainer 31 may be folded back toward the magnet 30 (although, in FIGS. 15A and 15B, only one end portion is folded back, both end portions may be folded) to form a second pressing portion 332 that presses the magnet 30 in the axial direction. Thus, the magnet 30 is prevented from being displaced in the axial direction in the magnet retainer 31.

In the embodiment described above, the rotor of a vehicle alternator has been described. However, the present invention may be applied to the rotor of a different rotary electric machine, such as a rotary electric machine that performs electrically-drive operation, or a rotary electric machine that performs both of electric-generation operation and electrically-driven operation.

As described above, according to the present invention, the projection of each magnet retainer can restrain the movement of the magnet retainer in the direction along the rotary shaft. Accordingly, the magnet retainer is reliably prevented from being displaced.

What is claimed is:

1. A rotor for a rotary electric machine, comprising:
a pair of Lundell-type cores that include a plurality of claw poles with flange portions projecting in a rotor circumferential direction from an end portion on an outer diameter side;
a plurality of magnets that are arranged between the claw poles of the pair of Lundell-type cores and that are magnetized in a direction of reduced or minimized flux leakage; and
a magnet retainer that is provided for each of the magnets, that retains each of the magnets and that includes a projection in at least one of side surfaces in a magnet retainer circumferential direction, the projection restraining a movement of the magnet retainer in an axial direction along a rotary shaft, wherein:
the magnet retainer includes: (i) a first surface that faces the flange portions of the claw poles adjacent to each other in the rotor circumferential direction via the magnet, (ii) a second surface that faces a circumferential side surface of one of the claw poles adjacent to each other, and (iii) a third surface that faces a circumferential side surface of the other of the claw poles adjacent to each other; and
the projection is configured to be foldable and is in contact with an end portion in the axial direction of each of the claw poles adjacent to each other via the magnet.

2. The rotor according to claim 1, further comprising:
an annular-shaped ring member that is formed at an inner diameter side of the claw poles, the magnet retainer being mounted on the ring member.

3. The rotor according to claim 2, wherein the magnet retainer has a snap-fit structure capable of mounting the magnet retainer on the ring member.

4. The rotor according to claim 2, wherein the magnet retainer is made of a non-magnetic material.

5. The rotor according to claim 2, wherein the magnet retainer includes a first pressing portion that is located in an inner side of a circumferential side surface and presses the magnet in the magnet retainer circumferential direction.

6. The rotor according to claim 1, wherein the magnet retainer is made of a non-magnetic material.

7. The rotor according to claim 1, wherein the magnet retainer includes a first pressing portion that is located in an inner side of a circumferential side surface and presses the magnet in the magnet retainer circumferential direction.

8. The rotor according to claim 1, wherein the magnet retainer includes a pressing portion that is located in an axial end portion of a circumferential side surface and presses the magnet in the axial direction.

9. The rotor according to claim 1, wherein the projection is positioned at an inner side in a radial direction of the flange portions.

10. The rotor according to claim 1, wherein the projection is configured to be foldable prior to and after insertion of the magnet retainer between the plurality of claw poles.

11. A rotor for a rotary electric machine, comprising:
a pair of Lundell-type cores that includes a plurality of claw poles with flange portions projecting in a rotor circumferential direction from an end portion on an outer diameter side;
a plurality of magnets that are arranged between the claw poles of the pair of Lundell-type cores and are magnetized in a direction of reducing flux leakage; and
a magnet retainer that retains each of the magnets and includes projections in two side surfaces in a magnet retainer circumferential direction, the projections restraining movement of the magnet retainer in an axial direction along a rotary shaft, wherein:
directions of the projections are reversed to each other; and
the claw poles have recesses in the side surfaces in the magnet retainer circumferential direction, the recesses corresponding to the projections.

12. The rotor according to claim 11, further comprising:
an annular-shaped ring member that is formed at an inner diameter side of the claw poles, the magnet retainer being mounted on the ring member.

13. The rotor according to claim 12, wherein the magnet retainer has a snap-fit structure capable of mounting the magnet retainer on the ring member.

14. The rotor according to claim 12, wherein the magnet retainer is made of a non-magnetic material.

15. The rotor according to claim 12, wherein the magnet retainer includes a first pressing portion that is located in an inner side of a circumferential side surface and presses the magnet in the magnet retainer circumferential direction.

16. The rotor according to claim 11, wherein the magnet retainer is made of a non-magnetic material.

17. The rotor according to claim 11, wherein the magnet retainer includes a first pressing portion that is located in an inner side of a circumferential side surface and presses the magnet in the magnet retainer circumferential direction.

18. The rotor according to claim 11, wherein the magnet retainer includes a pressing portion that is located in an axial end portion of a circumferential side surface and presses the magnet in the axial direction.

* * * * *